(12) United States Patent
Nally et al.

(10) Patent No.: US 6,598,110 B1
(45) Date of Patent: Jul. 22, 2003

(54) METHOD AND APPARATUS FOR DATA CONVERSION IN A COMPUTER BUS

(76) Inventors: Robert M. Nally, 3110 Candide La., McKinney, TX (US) 75070; Douglas M. Hamilton, 5251 S. Estes Way, Littleton, CO (US) 80123

( * ) Notice: Subject to any disclaimer, the term of this patent is extended or adjusted under 35 U.S.C. 154(b) by 0 days.

(21) Appl. No.: 09/447,193

(22) Filed: Nov. 22, 1999

Related U.S. Application Data

(60) Provisional application No. 60/109,895, filed on Nov. 25, 1998.

(51) Int. Cl.[7] ............................................... G06F 13/36
(52) U.S. Cl. ...................................... 710/312; 710/315
(58) Field of Search ............................... 710/305–315, 710/11, 105

(56) References Cited

U.S. PATENT DOCUMENTS

| | | | | |
|---|---|---|---|---|
| 5,748,913 A | * | 5/1998 | Shibahara | 710/14 |
| 6,052,133 A | * | 4/2000 | Kang | 345/519 |
| 6,052,744 A | * | 4/2000 | Moriarty et al. | 710/27 |
| 6,098,133 A | * | 8/2000 | Summers et al. | 380/52 |
| 6,188,381 B1 | * | 2/2001 | van der Wal et al. | 345/554 |
| 6,219,754 B1 | * | 4/2001 | Belt et al. | 710/313 |
| 6,297,794 B1 | * | 10/2001 | Tsubouchi et al. | 345/204 |

* cited by examiner

*Primary Examiner*—Paul R. Myers

(57) ABSTRACT

A system and method for reducing bottlenecks on a computer bus, by offloading specific types of high-bandwidth data from the system bus and passing that data directly to specialized target busses. In the computer system, the system bus, typically a PCI bus, is monitored for addresses corresponding to specific target devices. When these addresses are detected, the corresponding data is diverted from the system bus to the appropriate specialized bus. By doing so, bandwidth across the system bus is reduced, and the specialized data, which may be time-sensitive or real-time audio or video, is passes rapidly to the appropriate processor.

4 Claims, 3 Drawing Sheets

METHOD AND APPARATUS FOR DATA CONVERSION IN A COMPUTER BUS

This application claims priority under 35 USC §119(e)(1) of provisional application No. 60/109,895 filed Nov. 25, 1998.

BACKGROUND AND SUMMARY OF THE INVENTION

This application relates in general to computer communication interfaces, and more particularly to diverting data from a PCI bus to a video or audio device to reduce bus traffic on the PCI bus.

Background: The Computer Bus

Computer systems are conventionally designed with a generic system bus. A bus is a channel over which information flows between two or more devices. When data is passed between devices over a bus, address data must also be sent to indicate to the receiving device where in memory the received data should be stored. In some systems, this is accomplished by including some sort of flag bit with the transmitted data, to indicate which bytes or words should be treated as addresses and which should be treated as pure data. In other systems, each bus has a data bus and an address bus, where the address bus carries information about where in memory the data is to be transferred to or from.

The "1394 bus" and "card bus" are busses for connecting peripherals to a computing system, such as a personal computer. The local I/O bus of a personal computer is a high speed input/output bus for connecting peripherals to memory, chip sets, and the processor.

Background: The PCI Bus

One conventional local I/O bus is the Peripheral Component Interconnect bus (PCI). The PCI bus is 32 bits wide, but can be extended to 64 bit in width. PCI is a standard for interconnecting the peripherals, e.g. cards which are plugged into the motherboard, with both the system memory and the CPU of a computer system. Full technical details may be found in the *PCI Local Bus Specification* 2.1 (PCI SIG, 1995), which is hereby incorporated by reference. It was designed from the start to alleviate many of the headaches that installation of a new card into an ISA bus-based computer would cause (IRQ conflicts, address conflicts, etc.). All PCI standards are set by a committee to ensure wide industry support.

Background: Data Handling on a Generic System Bus

Communication within the computing system is accomplished by transferring data across the generic system bus. The system bus is designed to work effectively across multiple data types, band width, requirements, and destinations. The generic system bus is extremely valuable as it offers a common mechanism for introducing peripheral data to the computer system. However, the system bus is not optimized to work for any single function, and as a result, new data types, such as video or audio data, are not efficiently handled with the generic system bus. Conventionally, a computer system utilizing a generic system bus places all audio or video data on the PCI bus for processing within the computer system. Having seen the data on the computing system, the CPU transfers the data to a frame buffer coupled to the PCI bus. Therefore, an additional bus transfer of the data is involved. For high band width data, such as video or audio data, placing such data on the PCI bus may cause performance problems within the computing system as this data substantially consumes the entire band width of the PCI bus. What is needed is an interface capable of identifying data transmitted on a PCI bus corresponding to a high bandwidth device, such as a video device, and capable of data diverting such to the device without having to again transmit the data on the PCI bus.

Innovative System and Method for Data Conversion on a System Bus

The present application discloses a system and method for selectably redirecting data passing across a system bus. In particular, the innovative system watches a generic system bus, e.g. a PCI bus, for specific types of data, e.g. audio or video data, pulls this data from the PCI bus, and passes it directly to the target bus, which will typically be a bus which is optimized for that type of data.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
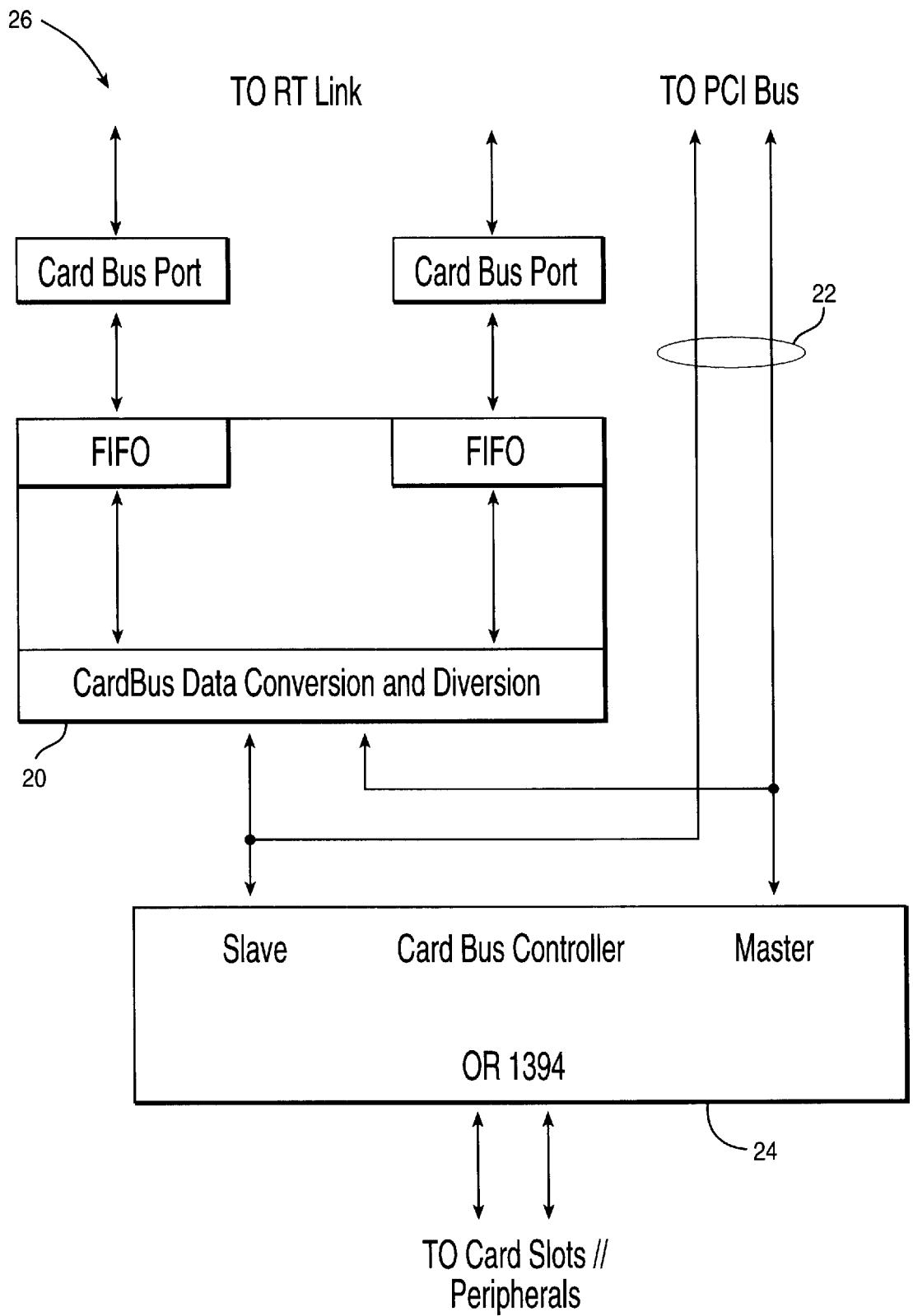
FIG. 1 illustrates in block diagram form the diversion mechanism of the present invention in conjunction with the PCI bus and the Card bus.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The presently preferred embodiment provides for the redirection of data through the generic system bus to any number of new optimized buses. The present invention identifies data types based on their source and destination addresses. The computing system, having a series of programmed traps, then diverts the data to the optimized bus for that type of data. In one embodiment, latency sensitive real time data is introduced to the system via the generic PCI bus. A real time hub identifies the data as being latency sensitive, and a redirection mechanism identifies the data within the address range specified by the system as real time data, and the data is redirected and transferred via the real time link. Data which is not identified as real time data is allowed to transfer by the generic PCI system bus if it is not trapped by another specific redirection mechanism.

In this manner, multiple optimized buses can be introduced to a computer system without changing the peripheral hardware. Data transfers can be efficiently implemented without modifying the industry standards. Peripherals will still be capable of introducing data in a manner common to other peripherals via the generic system bus.

A "bridge" device is provided to connect a first bus to a second bus thereby allowing devices on different buses to talk with devices on the other bus. A device capable of taking control of the bus and arbitrate between requests performs 'bus mastering' which eliminates the need for the processor to coordinate the entire data transfer between devices.

The presently preferred embodiment provides a diversion mechanism for diverting data from a conventional PCI bus to the audio or video devices for which the data is intended. Conventional personal computing systems generally utilize a memory mapped input/output configuration where data is passed from a generic multipurpose system bus (i.e., the PCI bus) to the CPU of the computing system. The CPU then passes the data to the appropriate device. For example, in video teleconferencing applications in conventional computing systems, the incoming video and audio data is placed in the PCI bus and initially processed by the CPU to determine the appropriate hardware device to pass the data. The CPU then transfers the data to the device, such as the frame buffer, again over the PCI bus. The bandwidth of the video data generally consumes a substantial portion of the bandwidth of the PCI bus during each of these transfers.

In accordance with the preferred embodiment, the diversion mechanism identifies data intended for video or audio applications and transfers the data to the appropriate device over a direct link to the device. In this manner, the number of high-bandwidth data transfers on the PCI is reduced so that the bus can be utilized by other devices in the computing system. Further, CPU processing load is decreased since it no longer is required to handle the transfer of the data from memory to the PCI bus.

FIG. 1 illustrates one embodiment of the diversion mechanism 20 of the present invention in conjunction with the PCI bus 22 and the. Card bus 24. The configuration shown in FIG. 1 is a parallel configuration where the diversion mechanism 20 is connected in parallel to the PCI bus 22. The diversion mechanism 20 provides data to the appropriate device over a real-time link 26.

The diversion mechanism 20 intercepts data intended for the PCI bus from the peripherals connected to the card bus 24. As will be discussed below, the diversion mechanism determines which data to intercept based on the address associated with the data. The diversion mechanism then processes the data, and transfers the data to the appropriate device. Conversely, data returned from a device within the computing system is converted and passed by the diversion mechanism 20 to the peripheral.

Figure 2:
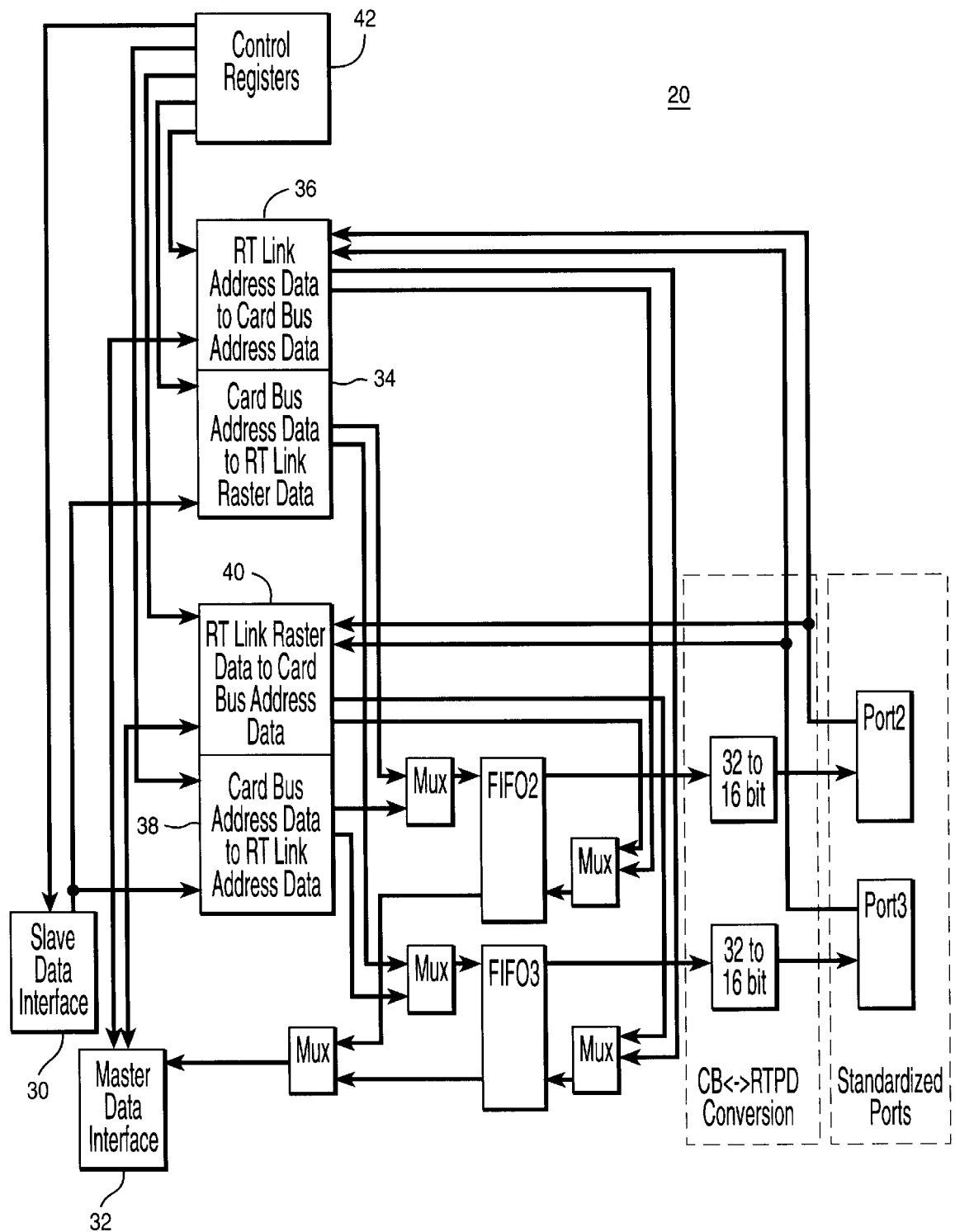
FIG. 2 illustrates in block diagram form one embodiment of the diversion mechanism of the present invention.

FIG. 2 illustrates one embodiment of the diversion mechanism of the present invention. A slave data interface 30, a master interface 32, translators 34, 36, 38, and 40, and control registers 42 are provided. Control registers 42 are provided for tracking any state variables or values required by the diversion mechanism 20 to perform its operations. The PCI bus generally supports full bus mastering.

The slave interface 30 determines whether data from the card bus controller (FIG. 1) will be passed to the devices through the real time bus. The slave interface makes this determination by decoding the destination address associated with the data from the card bus. If the decoded destination address corresponds to a device accessible over the real time bus, and the data operation is a write transfer operation, then the slave interface initiates the data transfer process. Conversely, the mater interface 32 passes data from the real time bus to the card bus. In burst mode, the PCI bus transfers information by providing an initial address corresponding to multiple sets of data which will be transferred in a row. The translators 34, 36, 38, and 40 all provide translations of data between the real time bus and the card bus. Specifically, translator 34 converts addressed data from the card bus to raster data intended for the real time bus. Translator 36 converts addressed data from the real time bus to addressed data intended for the card bus. Translator 38 converts addressed data from the card bus to addressed data intended for the real time bus. Translator 40 converts raster data from the real time bus to addressed data intended for the card bus.

Figure 3:
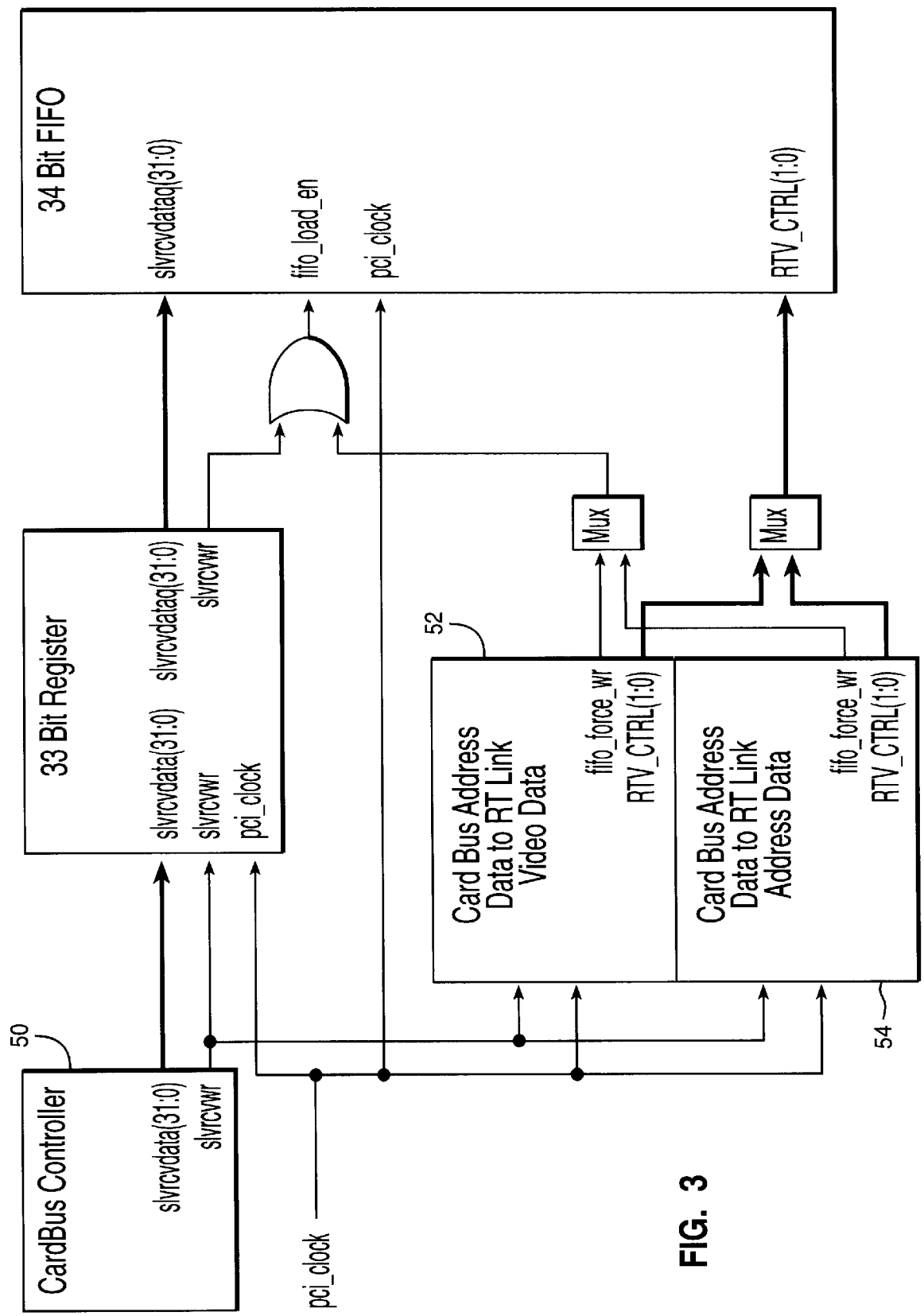
FIG. 3 illustrates a conversion mechanism utilized by one embodiment of the diversion mechanism of the present invention.

FIG. 3 illustrates a conversion mechanism utilized by one embodiment of the diversion mechanism of the present invention to convert card bus data to the real time bus. Data from the card bus controller 50 is converted either by conversion engine 52 or conversion engine 54. Conversion engine 52 converts addressed data from the card bus controller 50 to video or raster data to be placed on the real time bus. Such conversion involves, for example, conversion of 32 bit addressed data to 16 bit raster data for use in the frame buffer of the video device of the computing system.

Conversion engine 54 converts addressed data from the card bus controller 50 to addresses data to be placed on the real time bus. Such conversion involves, for example, conversion of 32 bit addressed data from the card bus to 16 bit data for use by a device on the real time bus.

According to a disclosed class of innovative embodiments, there is provided a system for transferring data from a first bus to a device coupled to a second bus while bypassing said second bus, the system comprising a bridge device, coupled to said first and said second bus, for translating said data from a first data format associated with said first bus to a second data format associated with said second bus; and a diversion mechanism monitoring said second bus to determine if said data should be diverted from said second bus to said device over a specialized bus adapted for said device.

According to another disclosed class of innovative embodiments, there is provided a method for managing data in a computer system, comprising the steps of receiving data on a system bus; monitoring at least a portion of said data as it passes over said bus; if said monitored portion of said data meets a predetermined criteria, then diverting the corresponding data to a second data bus; wherein said second data bus is optimized for the type of data diverted to it.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

What is claimed is:

1. A system for transferring data from a first bus to a device coupled to a second bus, the system comprising:
   a bridge device, coupled to said first and said second bus, for translating said data from a first data format associated with said first bus to a second data format associated with said second bus;
   a specialized bus coupled to said device; and
   a diversion mechanism coupled to said bridge device and said specialized bus, said diversion mechanism
      monitoring said first bus to determine if data is directed to said device and should be diverted from said second bus,
      if data on said first bus is directed to said device, then intercepting said data, translating said data from said second data format to a third data format associated with said specialized bus and transferring said data to said specialized bus for transmission to said device.

2. The system of claim 1, wherein said diversion mechanism further comprises:
   a slave data decoding a destination address associated with the data from the first bus.

3. The system of claim 1, wherein:
   said data includes a write command, a write address and write data; and
   said diversion mechanism includes a slave interface decoding said write address, said diversion mechanize operative to translate said write address and said write data from said first data format to said third data format for transmission to said device via said specialized bus if said write address is directed to said device.

4. The system of claim 1, wherein:
   said data includes a read command and a read address; and
   said diversion mechanism includes a slave interface decoding said read address, said diversion mechanize operative to
   translate said read address data from said first data format to said third data format for transmission to said device via said specialized bus, and
   receive read data from said device via said specialized bus, translate said read data from said third format to said first format and transmit said data to said bridge device.

* * * * *

UNITED STATES PATENT AND TRADEMARK OFFICE
CERTIFICATE OF CORRECTION

PATENT NO.     : 6,598,110 B1
DATED          : July 22, 2003
INVENTOR(S)    : Robert M. Nally et al.

It is certified that error appears in the above-identified patent and that said Letters Patent is hereby corrected as shown below:

<u>Title page,</u>
Item [73], Assignee, should read as follows:
-- [73] Assignee: Texas Instruments Incorporated,
                  Dallas, TX --
Add: item [74]
-- [74] *Attorney, Agent, or Firm*: Robert D. Marshall, Jr.; W. James Brady, III;
        Frederick J. Telecky, Jr. --

Signed and Sealed this

Twenty-seventh Day of January, 2004

JON W. DUDAS
*Acting Director of the United States Patent and Trademark Office*